United States Patent [19]

Welsh et al.

[11] 4,292,282

[45] Sep. 29, 1981

[54] PROCESS FOR RECOVERING METALS FROM CATALYSTS FOR THE HYDRODESULFURIZATION OF HYDROCARBONS

[75] Inventors: Jay Y. Welsh, Catonsville, Md.; Pierre C. Picquet; Pierre D. Schyns, both of Mons, Belgium

[73] Assignee: Societe Europeenne des Derives du Manganese, en abrege Sedema Societe Anonyme, Brussels, Belgium

[21] Appl. No.: 137,695

[22] Filed: Apr. 7, 1980

[30] Foreign Application Priority Data

Apr. 9, 1979 [FR] France ............................. 79 08940

[51] Int. Cl.³ ................... C01G 39/04; C01G 31/04; C01F 7/56
[52] U.S. Cl. ....................................... 423/60; 423/62; 423/135; 423/136; 423/138; 423/150; 252/415
[58] Field of Search ................... 423/60, 62, 135, 136, 423/138, 150; 252/415

[56] References Cited

U.S. PATENT DOCUMENTS

| | | | |
|---|---|---|---|
| 3,180,706 | 4/1965 | Erickson | 423/60 |
| 4,182,747 | 1/1980 | Grauey et al. | 423/60 |
| 4,216,118 | 8/1980 | Yoshida et al. | 423/62 |

FOREIGN PATENT DOCUMENTS

| | | | |
|---|---|---|---|
| 550458 | 12/1957 | Canada | 423/62 |
| 65929 | 11/1972 | Poland | 423/60 |
| 521975 | 6/1940 | United Kingdom | 423/60 |
| 263569 | 2/1970 | U.S.S.R. | 423/60 |

*Primary Examiner*—Herbert T. Carter
*Attorney, Agent, or Firm*—Sughrue, Mion, Zinn, Macpeak and Seas

[57] ABSTRACT

This invention relates to the recovery of molybdenum, vanadium, and aluminum, as well as of cobalt and nickel, from the residues of hydrodesulfurization catalysts.

17 Claims, 1 Drawing Figure

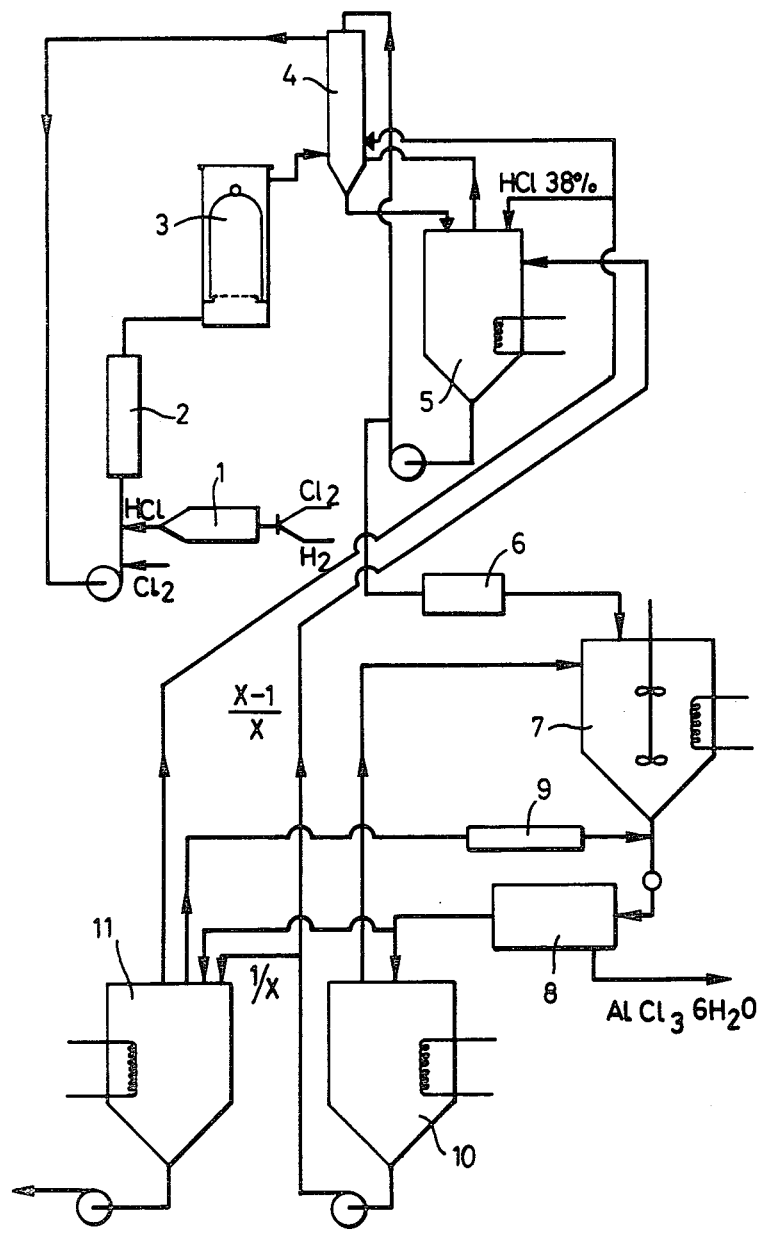

PROCESS FOR RECOVERING METALS FROM CATALYSTS FOR THE HYDRODESULFURIZATION OF HYDROCARBONS

PRIOR ART

Molybdenum-containing catalysts are used in the petroleum industry for the hydrodesulfurization of hydrocarbons. The hydrodesulfurization treatment consists in contacting petroleum or a petroleum fraction with hydrogen in the presence of a catalyst so as to remove the sulfur as gaseous hydrogen sulfide. The catalysts used for said purpose generally comprise a support material made of alumina containing, as active components, either molybdenum and cobalt or molybdenum and nickel. Sometimes catalysts in which the support consists of silica in place of alumina are also used.

The active components, i.e. molybdenum, cobalt and/or nickel, are present as oxides in the fresh catalysts. The percentages of active components are variable. In most cases, these percentages are of about 10–15% for molybdenum oxide ($MoO_3$) and of about 4–5% for cobalt oxide ($CoO$) or nickel oxide ($NiO$).

During the hydrodesulfurization, carbonaceous materials are deposited on the catalyst. These carbonaceous deposits which reduce the activity of the catalyst can be removed by oxidation with air, regenerating the catalyst. During the hydrodesulfurization, a reaction also takes place between the released hydrogen sulfide and a part of the components of the catalyst, so that metal sulfide compounds are formed. Moreover, the catalyst gradually picks up metals contained in the treated petroleum fractions. These metals mainly consist of vanadium and nickel. They accumulate and embed themselves in the pores of the catalyst, so that the activity of the catalyst gradually decreases. When the activity of the catalyst has decreased in such a manner to the extent that efficient hydrodesulfurization no longer occurs, the catalyst is removed as a residue and replaced by fresh catalyst.

It is advisable to treat these spent hydrodesulfurization catalysts, since their mere discharge creates a pollution problem and, moreover, they contain metal values which are economically recoverable for other applications.

This invention relates to the recovery of metals from hydrodesulfurization catalysts residues by a chlorination process in which molybdenum and vanadium oxychlorides and aluminum chloride are separated by volatilization.

It is known that molydbenum and vanadium may be separated from materials containing these metals, such as ores or catalysts residues by treatment with chlorine or hydrogen chloride, so as to form molybdenum and vanadium oxychlorides which are volatilized.

For example, French Pat. No. 724,905 discloses a process for extracting molybdenum, tungsten and vanadium from materials containing these elements by a treatment at 300°–400° C. with chlorine or gaseous hydrogen chloride. The materials treated are processed as mixtures with carbonaceous materials. These carbonaceous materials may be added to the starting material as coke, lignite, charcoal and the like or may already be present in this starting material, for example in the case of certain catalysts, such as those which have been used for the hydrogenation of coal. The volatilized oxychlorides can be condensed in powder form by cooling or can be decomposed by water or water vapor. In this process, the conditions are such that the other metals present in the starting material capable of forming volatile chlorides, such as iron, aluminum or zinc, are volatilized to a very limited extent; the formation of volatile aluminum chloride occurs rather slowly.

U.S. Pat. No. 3,180,706 describes a process for recovering metals from used catalysts, namely from spent hydrodesulfurization catalysts, by chlorination after a preliminary oxidation and a preliminary sulfiding of the catalyst. The chlorination is effected in the vapor phase, at a temperature of about 290° C. to 370° C., by means of a substantially anhydrous chlorinating agent consisting of chlorine or preferably of a mixture of chlorine and a carbon or sulfur compound of chlorine, such as carbon tetrachloride. The chlorination causes the volatilization of molybdenum as a chloride and converts cobalt and nickel into soluble chlorides. The purposes of the preliminary oxidation and sulfiding steps are to improve the separation of the metals. The oxidation treatment is effected at about 650°–1000° C. by means of an oxygen-containing gas, during a sufficient time for allowing the conversion of a major part of the molybdenum into its highest valence. During this oxidation, the carbon contained in the catalyst is also removed by combustion. The sulfiding treatment is effected at about 430°–800° C. by means of vapors of sulfur or a volatile sulfide, such as hydrogen sulfide, carbon sulfide or a mercaptan. After oxidation, sulfiding and chlorination, molybdenum is recovered from the chlorination vapors either by condensing molybdenum chloride in powder form by cooling or by contacting it with an aqueous solution for dissolving the chlorides, while avoiding a solubilization of alumina. A drawback of this process is that several successive treatments of the catalyst are needed. The oxidation treatment, due to the presence of sulfur in the catalyst, releases polluting sulfur dioxide. Moreover, said process does not allow an easy recovery of aluminum.

The heretofore proposed methods for recovering, molybdenum and vanadium, possibly together with aluminum from spent catalysts by chlorination, need substantially anhydrous chlorinating agents, such as chlorine or hydrogen chloride, for the purpose of obtaining the highest possible metal extraction yields. Indeed, it is known that the presence of water in the chlorinating agent decreases the extraction yields. The inhibiting effect of the water on the extraction of the metals as volatile chlorides is particularly noticeable in the case of volatilization of aluminum or other metals, such as iron, the chlorides of which tend to be decomposed by water to form hydroxides.

A drawback of the use of anhydrous chlorinating agents is that problems occur when a recycle of the unused chlorinating agent is desired, and particularly when the volatile chlorides or oxychlorides are extracted from the gaseous chlorination mixture by a wet process, i.e. by means of water or an aqueous solution. Water in this case would be carried as a vapor in the gaseous recycle mixture. The recycling of the unused gases, when the chlorination takes place in an anhydrous medium, almost necessarily requires a drying of the recycled gas.

DESCRIPTION OF THE INVENTION

Applicants have now found that it is possible to recover, by chlorination, in a simple manner and with extraordinary yields, molybdenum, vanadium, aluminum, as well as cobalt and nickel from hydrodesulfurization catalyst residues, by effecting the chlorination by means of a mixture of gaseous chlorine, gaseous hydrogen chloride and water vapor, so as to volatilize the oxychlorides of molybdenum and vanadium and the aluminum chloride, and by absorbing the volatilized products by means of an aqueous solution containing hydrochloric acid.

According to the invention, the hydrodesulfurization catalyst residue from which the residual hydrocarbons have been previously removed, is chlorinated at temperatures increasing from about 200° C. to about 400° C., by means of a mixture of gaseous chlorine, gaseous hydrogen chloride and water vapor. The gaseous mixture should contain no more than about 15% of water vapor by volume relative to the total gaseous mixture. The volatilized oxychlorides and chlorides are absorbed by a saturated or nearly saturated aqueous solution of hydrochloric acid temperatures controlled between about 20° C. and about 70° C.

The aluminum chloride is separated by precipitation as a hexahydrated chloride from the solution obtained by absorption of the volatile oxychlorides and chlorides, leaving a solution of the molybdenum and vanadium chlorides from which the excess of hydrochloric acid is recovered and recycled into the process. The recovered hydrochloric acid along with the necessary additions of chlorine and hydrogen chloride can be recycled into the process, for example, at the absorption step just described. The cobalt and the nickel are recoverd from the non-volatile portion of the catalyst as water soluble chlorides.

Before the chlorination of the hydrodesulfurization catalyst, the residual hydrocarbons are removed therefrom, for example by extraction by means of an organic solvent. Petroleum ether having a boiling point of 50° C. may be used as a solvent. The amount of hydrocarbons which are thereby extracted from the catalyst is about 15% by weight of the catalyst. After extraction, the solvent which is recycled into the extraction step is recovered by distillation. The hydrocarbons resulting from the catalyst may be used as fuel for the distillation of the solvent.

It is not necessary to remove the carbon contained in the catalyst prior to the chlorination by a calcination step. Such a calcination treatment is, in fact, not advisable, since it causes the release of polluting sulfur dioxide and moreover would result in the formation of a cobalt aluminate, so that the extraction of the cobalt becomes more difficult.

After the preliminary step of extracting of the hydrocarbons, the catalyst is subjected a chlorination treatment by means of a mixture of gaseous chlorine, gaseous hydrogen chloride and water vapor at a temperature increasing from about 200° C. to about 400° C.

The chlorinating gaseous mixture is a recycled gas resulting from the step of absorbing the volatile oxychlorides and chlorides, to which the necessary amounts of chlorine and/or hydrogen chloride have been added, so as to maintain the desired amounts and proportions of chlorine, hydrogen chloride and water vapor.

The proportions of chlorine, hydrogen chloride and water vapor in the chlorinating mixture may vary. However, the proportion of water vapor may not exceed a value beyond which the extraction yields of the metals as volatile chlorides and oxychlorides are adversely affected. It is advisable that the water vapor content of the chlorinating mixture does not exceed about 15% by volume. The minimum content of water vapor in the chlorinating mixture mainly depends on the operating conditions. Indeed, there is always a certain amount of water in the chlorinating mixture, since the gases resulting from the step of absorbing the volatile chlorides and oxychlorides are recycled. Under normal operating conditions, the water vapor content of the chlorinating mixture is generally not lower than about 2% by volume.

The relative proportions of chlorine and hydrogen chloride in the chlorinating mixture may vary within rather broad limits. The chlorine and the hydrogen chloride both react with the oxides present in the catalyst, so as to form chlorides and oxychlorides. Specifically, volatile molybdenum ($MoO_2Cl_2$) and vanadium ($VOCl_3$) oxychlorides and volatile aluminum chloride ($AlCl_3$) are formed, as well as cobalt chloride ($CoCl2$) and nickel chloride ($NiCl2$). The chlorine also acts as an oxidizing agent to bring the molybdenum and the vanadium to their higher valences.

The best extraction results are obtained by using more or less equivalent proportions of chlorine and hydrogen chloride in the gaseous chlorinating mixture. Preferably, chlorinating mixtures containing from about 40 to 60% by volume of chlorine, from about 40 to 60% by volume of hydrogen chloride and from about 5 to 10% by volume of water vapor are used. Generally, these chlorinating mixtures give extraction yields of more than 70% for the aluminum chloride and of more than 95% for the oxychlorides of molybdenum and vanadium. During the volatilization of the oxychlorides of molybdenum and vanadium and of the aluminum chloride, some volatilization of the cobalt, as chloride, contained in the catalyst takes place. The fraction of cobalt volatilized in this manner amounts to about 15% of the cobalt content of the catalyst. Moreover, a small amount of the sulfur present in the catalyst may be removed by sublimation along with the volatilized chlorides and oxychlorides.

The chlorination is effected at temperatures increasing continuously or step by step from about 200° C. to about 400° C. Temperatures of more than 400° C. are avoided, since at these high temperatures, an excessive amount of the sulfur contained in the catalyst is sublimated, whereas at less than 200° C., the extraction yields, particularly of the molybdenum are insufficient.

The chlorination may be effected in any suitable device. For example, a vertical enclosure may be employed containing a perforated basket into which a charge of catalyst granules is placed. The basket can be easily removed at the end of the reclaim cycle and replaced with a new catalyst charge. The gaseous chlorinating mixture, previously heated by passing through a heat exchanger, enters the bottom of the enclosure containing the catalyst, passes through the catalyst bed and is removed at the top of the enclosure together with the volatilized chlorides and oxychlorides. From the top of the enclosure, the gaseous mixture passes through the absorption column where the chlorides and oxychlorides are removed.

The chlorination in the process according to this invention is advantageously affected, in a continuous manner, by recycling to the chlorination step, the residual gases from the step of absorbing the volatile chlorides and oxychlorides after addition of the necessary amounts of chlorine and/or hydrogen chloride. It is possible to pass the gaseous chlorinating mixture through the catalyst several times until volatile oxychlorides and chlorides are no longer formed. When exhausted, the catalyst is removed and replaced by a new charge. It is also possible to effect the chlorination by means of two catalyst-containing enclosures operating alternatively, so that after exhaustion of the catalyst in one enclosure, the gaseous chlorinating mixture is diverted to the other enclosure containing a fresh charge of catalyst to be treated.

The volatilized oxychlorides of molybdenum and vanadium and the volatilized aluminum chloride are separated from the gaseous mixtures resulting from the chlorination by absorption in an aqueous solution containing hydrochloric acid at a temperature between about 20° C. and about 70° C. A solution in which the molybdenum, the vanadium and the aluminum are dissolved as chlorides is thus obtained.

For absorbing the volatile oxychlorides and chlorides, a saturated or nearly saturated hydrochloric acid solution is used, to avoid the absorption of hydrogen chlorine.

The absorption temperature must be controlled between about 20° C. and about 70° C. Indeed, beyond 70° C., the vaporization of water vapor into the gases recycling to the chlorination step is too great, whereas at a temperature below 20° C., the aluminum chloride tends to precipitate as hexahydrated aluminum chloride. Preferably, the absorption is effected at a temperature between about 60° C. and about 65° C.

The absorption may be performed by means of a plate column, in which the gaseous mixture entering at the bottom of the column contacts a counter flow of the absorption solution introduced at the top of the column.

At the bottom of the absorption column, a concentrated aqueous solution of hydrochloric acid containing the chlorides of molybdenum, vanadium and aluminum is collected. A part of said solution is recycled as absorption solution; this recycling takes place by pumping said part of the aqueous solution, after cooling, to the top of the absorption column. The cooling of the solution before recycling is necessary, since an increase of the temperature has taken place as a result of the absorption. The temperature increase is due to the exothermic dissolution of the chlorides and oxychlorides and the absorption of hydrogen chloride.

According to the invention, the solution from the absorption column discharges into a tank equipped with cooling means, wherein the temperature of said solution is decreased below about 70° C., preferably to a value comprised between about 60° C. and about 65° C. a portion of said solution being then recycled into the absorption column.

In order to reconstitute the absorption solution, it is advantageous, in accordance with this invention, to use also a part of the hydrochloric solutions containing the molybdenum and vanadium chlorides obtained later in the process, after the separation of the aluminum chloride. Said solutions may, for example, be those formed during the recovery treatment of the excess of hydrochloric acid by heating the solution of the molybdenum and vanadium chlorides. Since these solutions are at a high temperature, it may be necessary to cool the part or fraction thereof which is recycled into the absorption column, for example by sending said fraction into the tank equipped with cooling means, wherein the solution coming from the absorption column is collected.

According to a feature of the invention, the gaseous hydrogen chloride recovered later by heating the solution of the molybdenum and vanadium chlorides may also advantageously be recycled to the absorption step. This gaseous hydrogen chloride, which is mixed with water vapor, may be recycled either by introducing it directly into the bottom of the absorption column, or by introducing it into the tank equipped with cooling means, wherein the solution coming from the absorption step is collected.

Means for introducing water and/or hydrochloric acid into the absorption system must be provided, in order to compensate the lost amounts which are not recycled into the process. These additions may be made, for example in the recycle line of the absorption solution or in the tank where the solution is collected.

After absorption of the volatile chlorides rides and oxychlorides, the resulting solution is treated so as to separate the aluminum chloride as a precipitate of hexahydrated aluminum chloride. However, before effecting such a precipitation, it is preferable to remove the sulfur from the solution, since the sulfur can interfere with the precipitation and the filtration of the aluminum chloride. The removal of the sulfur is effected by mere filtration of the solution on a conventional filter.

The precipitation of the hexahydrated aluminum chloride ($AlCl_3.6H_2O$) is effected by saturating the colled solution with gaseous hhydrogen chloride. For this purpose, the hydrochloric acid concentration of the solution is brought to about 44% by weight, while cooling to a temperature of about 10° C. to about 15° C. This can be done, for example, in an agitated tank equipped with means for cooling by introducing gaseous hydrogen chloride.

The gaseous hydrogen chloride used for the precipitation of the hexahydrated aluminum chloride, in accordance with the present invention, may advantageously be obtained from recycled gases. For example, the required hydrogen chloride can be obtained from the solution containing the molybdenum and vanadium chlorides by recovery of the excess hydrochloric acid.

The precipitated hexahydrated aluminum chloride is then separated from the solution by filtration and is washed by means of a saturated hydrochloric acid solution.

After the separation of the aluminum chloride, a saturated hydrochloric acid solution containing the molybdenum and vanadium chlorides is obtained. This solution is then heated in order to recover the excess of hydrochloric acid, which may be recycled into the process, so as to obtain a solution of molybdenum and vanadium chlorides having a low hydrochloric acid concentration.

This recovery treatment of the excess of hydrochloric acid by heating saturated hydrochloric acid solution containing the molybdenum and vanadium chlorides may be performed in one or more steps.

It is particularly suitable, in accordance with this invention, to effect the heating of the saturated hydrochloric acid solution containing the molybdenum and vanadium chlorides in two steps, under such conditions that a starting saturated hydrochloric acid solution, i.e. a solution containing about 44% by weight of hydrochloric acid at 10° C., is converted into a final solution containing about 20% by weight of hydrochloric acid.

During the first step, the solution is heated at about 80° C. At this temperature, a mixture of gaseous hydrogen chloride and of water vapor is released. This gaseous mixture which contains a substantial amount of hydrogen acid and has a water vapor content of about 15.8% by volume, may be recycled into the process, particularly at the step of precipitation of the hexahydrated aluminum chloride. The hydrochloric acid content of the solution is decreased during this first step to about 32% by weight. It is advantageous to recycle a part of this solution to the absorption step of the process.

During the second step, the solution is heated to a temperature of 108.6° C., which is the boiling point of azeotropic mixture of water and hydrochloric acid containing 79.8% by weight of water and 20.2% by weight of hydrochloric acid. The gaseous mixture released during said second step may be recycled into the process, particularly at the step of absorption of the volatile chlorides and oxychlorides.

After the recovery treatment of the excess of hydrochloric acid, the solution of the molybdenum and vanadium chlorides, which as a low hydrochloric acid content may be treated by several methods, in order to separate the molybdenum and from vandium. For example, one of these methods involves the neutralization of the solution with ammonia so as to precipitate the vanadium as ammonium metavanadate which is separated by filtration and the subsequent conversion of the molybdenum into ammonium tetramolybdate.

The catalyst residue, obtained after the chlorination treatment, contains the cobalt and the nickel as water soluble chlorides. By a treatment with water, these metals are recovered with yields of more than 90%, if the fraction of volatilized cobalt is added thereto. The cobalt and the nickel may finally be recovered from the solution of the chlorides by known processes.

The invention is illustrated by the following non-limiting example:

EXAMPLE

The attached drawing schematically shows an embodiment of the process according to this invention.

Hydrogen chloride obtained by combustion of hydrogen with chlorine in a burner 1, and chlorine are added to a recycled gas the the gaseous mixture is sent into a heat exchanger 2 made of tantalum. In this heat exchanger, the temperature of the gaseous mixture is increased to about 200° to 400° C. Thereafter, the heated gaseous mixture is sent into a vertical enclosure 3 containing the spent catalyst placed in a removable basket. This catalyst enclosure has a tantalum coating, in order to resist to the corrosion of the gaseous mixture up to a temperature of 400° C. The top of the catalyst enclosure is opened, so as to allow the replacement of the basket containing the catalyst after exhaustion of the charge. At the outlet of the catalyst enclosure, the gaseous mixture containing volatilized aluminum and cobalt chlorides as well as molybdenum and vanadium oxychlorides is sent through a heated pipe into the bottom of an absorption column 4, wherein it is contacted by the counter-current flow of a hydrochloric acid saturated absorption solution at a temperature of about 65° C.

Recycled hydrogen chloride, recovered from a boiler 11 as an azeotropic mixture with water vapor, is also introduced into the bottom of the absorption column 4. The saturated hydrochloric acid solution introduced at the top of the absorption column 4 comes from a buffer tank 5 equipped with cooling means. The solution flowing from the bottom of the absorption column is collected in said tank 5. The buffer tank 5 is also equipped with a means for introducing recycled hydrochloric acid which is recovered as a 32% solution from a boiler 10, as well as fresh hydrochloric acid in the form of a 38% aqueous solution. A pipe connecting the top of the buffer tank 5 to the bottom of the absorption column 4 allows the recycling of the gases released from the absorption solution. The volume of the tank 5 is determined by the number of catalyst charges which are treated with the same absorption solution. The solution may contain sulfur particles which are not troublesome for the absorption. This is not true if the concentration of the solution exceeds 8.8 g of aluminum per liter at 65° C., the aluminum chloride then precipitates in the form of a hexahydrate. Clogging due to this crystallization may then occur in the column and it is difficult to filter the mixture of sulfur - $AlCl_3.6H_2O$. The solution fraction coming from the buffer tank 5, which is not recycled to the absorption column, before reaching the critical concentration of 8.8 g of Al/liter at 65° C., is sent to a filter 6 so as to remove the sulfur and they to a saturator 7 equipped with cooling means and stirrers, wherein gaseous hydrogen chloride recovered from the boiler 10 is introduced. After the solution is saturated at 10° C. by hydrochloric acid, the suspension is sent to a filter 8, which separates the hexahydrated aluminum chloride. The precipitate is washed with an aqueous solution of hydrochloric acid obtained by condensation in a cooler 9 of a mixture of gaseous hydrogen chloride and water vapor recovered from the boiler 11. The solution which no longer contains aluminum chloride is sent to the boiler 10, where it is heated at 80° C. The distilled hydrochloric acid is recycled into the saturator 7. The solution coming from the boiler 10 is recycled into the buffer tank 5, except a fraction 1/X of said solution, X representing the number of catalyst charges treated with the same absorption solution, which is sent into the boiler 11, wherein it is distilled until the azeotrope temperature of (108.6° C.) is reached and then further evaporated to a volume of 50%. The solution of the metal chlorides is then sent to the system for the recovery of vanadium and molybdenum. The distilled hydrochloric acid is recovered by recycling it into the bottom of the absorption column 4.

The exhausted catalyst charge, removed from the catalyst enclosure 3, is treated with warm water, so as to solubilize the nickel and cobalt chlorides. This solution is then advanced to a conventional installation for the separation of nickel and cobalt.

By way of example, five successive charges of spent catalyst (X=5) were chlorinated, using the same absorption solution, so as to obtain satisfactory molybdenum and vanadium concentrations at the same time a sufficient volume of solution for was maintained to completely solubilize the aluminum chloride.

The analysis of the spent catalyst was as follows

|  | Catalyst to be treated | Analysis after extraction with petroleum ether |
| --- | --- | --- |
| Vanadium | 7.22% | 8.40% |
| Molybdenum | 5.42% | 6.30% |

-continued

|  | Catalyst to be treated | Analysis after extraction with petroleum ether |
|---|---|---|
| Aluminum | 17.72% | 20.60% |
| Cobalt | 1.03% | 1.20% |
| Nickel | 2.00% | 2.33% |
| Soluble in petroleum ether | 14.00% | — |

The chlorination treatment was effected on 500 g of fractions spent catalyst, from which the oil was extracted by means of petroleum ether. The chlorinating gas contained an average of 46% of chlorine, 46% of hydrogen chloride and 8% of water vapor at a flow rate of 610 liters/hour. The buffer tank 5 of the absorption column contained 5 liters of a solution saturated with hydrochloric acid at 65° C. Before the precipitation of the aluminum as hexahydrated chloride, 11 to 18 g of sulfur was filtered; this sulfur still contained small amounts of the extracted elements (see table 2). 5 liters of a 20% hydrochloric acid solution having the following metal content was obtained:

Vanadium: 39.5 g/l
Molybdenum: 30.2 g/l
Aluminum: 0.17 g/l
Cobalt: 0.52 g/l
Nickel: 0.03 g/l The catalyst residue remaining after each chlorination was treated with 1 liter of boiling water for 1 hour and the resulting suspension was filtered. As shown by the following table 2, the filtrate contained most of the cobalt present in the starting catalyst, nearly all the nickel and a small amount of aluminum. After five successive treatments, a solution (5 liters) having the following metal content was obtained:

Vandium: 0.046 g/l
Molybdenum: 0.037 g/l
Aluminum: 9.76 g/l
Cobalt: 4.63 g/l
Nickel: 11.43 g/l The residue of the filtration was dried at 100° C. and analyzed, in order to know the remaining metals and, by difference, the metal extraction yields.

The results obtained are given in the following tables 1 and 2:

TABLE 1

| Operation No. | Extraction yields | | | | |
|---|---|---|---|---|---|
|  | V % | Mo % | Al % | Co % | Ni % |
| 1 | 99.20 | 94.74 | 60.39 | 92.70 | 98.62 |
| 2 | 99.21 | 96.40 | 76.01 | 95.50 | 99.31 |
| 3 | 99.32 | 96.60 | 71.60 | 95.23 | 98.95 |
| 4 | 99.20 | 97.41 | 67.30 | 94.06 | 97.82 |
| 5 | 99.36 | 98.61 | 75.54 | 96.09 | 99.00 |
| Averages | 99.26 | 96.75 | 70.17 | 94.71 | 98.74 |

TABLE 2

| | Distribution of the extracted metals (average of 5 operations) | | | | |
|---|---|---|---|---|---|
|  | V % | Mo % | Al % | Co % | Ni % |
| Solution of chlorides after separation of the aluminum | 94.18 | 96.03 | 0.34 | 17.55 (**) | 0.56 |
| Solution nickel cobalt | 0.11 | 0.12 | 9.48 | 77.20 | 98.17 |
| AlCl₃ . 6H₂O | 4.92 (*) | 0 | 60.49 | 0 | 0 |
| Residual sulfur | 0.06 | 0.74 | 0.13 | 0.03 | 0.02 |
| Total | 99.27 | 96.89 | 70.44 | 94.78 | 98.75 |

(*) This vanadium can be recovered during a second purification for the purification of AlCl₃ . 6H₂O.
(**) This cobalt remains in the solution after precipitation of the vanadium and of the molybdenum; it can be recovered as CoS.

What we claim is:

1. A process for recovering molybdenum, vanadium an aluminum metal values from residues of hydrodesulfurization catalysts from which catalysts the residual hydrocarbons have been removed, comprising chlorinating said residues of hydrodesulfurization catalysts using a mixture of gaseous chlorine, hydrogen chloride and water vapor at a temperature of from about 200° C. to about 400° C., whereby the molybdenum and vanadium are volatilized as oxychlorides and aluminum is volatilized as chloride, and absorbing said volatilized oxychlorides and chloride at a temperature between about 20° C. and about 70° C. into an aqueous medium containing hydrochloric acid.

2. A process according to claim 1, in which said volatilized oxychlorides and chloride are absorbed into an aqueous solution which is substantially saturated with hydrochloric acid.

3. A process according to claim 1, wherein said mixture of gaseous chlorine, hydrogen chloride and water vapor contains at most about 15% by volume of water vapor relative to the total gaseous mixture.

4. A process according to claim 1 wherein the process comprises recycling residual gases from said absorption of said volatilized oxychlorides and chloride after the addition of gaseous chlorine and hydrogen chloride in amounts sufficient to maintain the desired amounts and proportions of chlorine, hydrogen chloride and water vapor in said gaseous mixture.

5. A process according to claim 1, wherein cobalt is also contained in said residues of hydrodesulfurization catalysts and a portion is also volatilized in said chlorinating step.

6. A process according to claim 5, wherein said aluminum chloride is precipitated from said aqueous medium containing hydrochloric acid as hexahydrated aluminum chloride.

7. A process according to claim 6, wherein said aluminum chloride is precipitated with excess gaseous hydrogen chloride obtained from said aqueous medium containing hydrochloric acid recycled after precipitation from said aqueous medium of said aluminum chloride.

8. A process according to claim 6, wherein said aqueous medium containing hydrochloric acid is treated after precipitation of said aluminum chloride, which treatment comprises:
 (1) heating said medium to a temperature of about 80° C. to release a mixture of gaseous hydrogen chloride and water vapor; and
 (2) heating said medium to a temperature of about 108° C. to release thereby a second gaseous mixture of hydrochloride and water vapor.

9. A process according to claim 8, in which the gaseous mixture of step (1) and the gaseous mixture of step (2) are recycled into said process.

10. A process according to claim 1, wherein cobalt and nickel are also contained in said residues and including a step comprising the recovery as water soluble chlorides of nickel and cobalt contained in said residues of hydrodesulfurization catalysts after chlorinating said residues with said mixture of gaseous chlorine, hydrogen chloride and water vapor.

11. A process according to claim 1, wherein said mixture of gaseous chlorine, hydrogen chloride and water vapor contains water vapor in an amount of between about 2% and 15% by volume.

12. A process according to claim 1, wherein said mixture of gaseous chlorine, hydrogen chloride and water vapor contains substantially equivalent amounts of hydrogen chloride and chlorine.

13. A process according to claim 12, in which said mixture of gaseous chlorine, hydrogen chloride and water vapor contains about 40% to 60% by volume of chlorine, about 40% to 60% by volume of hydrogen chloride and about 5% to 10% by volume of water vapor.

14. A process according to claim 1, in which said volatilized oxychlorides and chloride are absorbed into said aqueous medium containing hydrochloric acid at a temperature of between about 60° C. and about 65° C.

15. A process according to claim 1, in which at least a part of said aqueous medium containing hydrochloric acid is recycled in said process for the absorption of said volatilized oxychlorides and chloride.

16. A process according to claim 15, wherein said recycled portion of said aqueous medium containing hydrochloric acid is cooled to a temperature of less than about 70° C. before recycling.

17. A process according to claim 16, wherein said recycled portion is cooled to a temperature of between about 60° C. and about 65° C.

* * * * *